United States Patent [19]
Dietrich

[11] 4,167,362
[45] Sep. 11, 1979

[54] MULTIPLE TOOL DRIVING TURRET ATTACHMENT

[76] Inventor: Otto E. Dietrich, 617 W. Jackson St., Morton, Ill. 61550

[21] Appl. No.: 889,042

[22] Filed: Mar. 22, 1978

Related U.S. Application Data

[63] Continuation-in-part of Ser. No. 787,913, Apr. 15, 1977, abandoned.

[51] Int. Cl.² ............................................. B23B 39/20
[52] U.S. Cl. ...................................... 408/35; 408/117
[58] Field of Search ........................... 408/35, 117, 234

[56] References Cited

U.S. PATENT DOCUMENTS

| | | | |
|---|---|---|---|
| 431,108 | 7/1890 | Cowley | 408/117 |
| 790,484 | 5/1905 | Denyes | 408/117 |
| 1,444,334 | 2/1923 | Cleveland | 408/117 |
| 1,460,219 | 6/1923 | Ziloccki | 408/117 |
| 2,303,565 | 12/1942 | Luna | 408/117 |
| 2,322,450 | 6/1943 | Johnstone | 408/35 |
| 2,368,009 | 1/1945 | Drane | 408/117 |

*Primary Examiner*—Leonidas Vlachos
*Attorney, Agent, or Firm*—James R. Bell

[57] ABSTRACT

A tool driving attachment is provided for use with a tool driving machine having a rotatable powered driving member. The attachment includes a first tool driving member which is connectable with the powered member for rotation therewith. A second tool driving member may be guided and resiliently locked into and out of rotating engagement with the first tool driving member when the first member is rotating.

17 Claims, 16 Drawing Figures

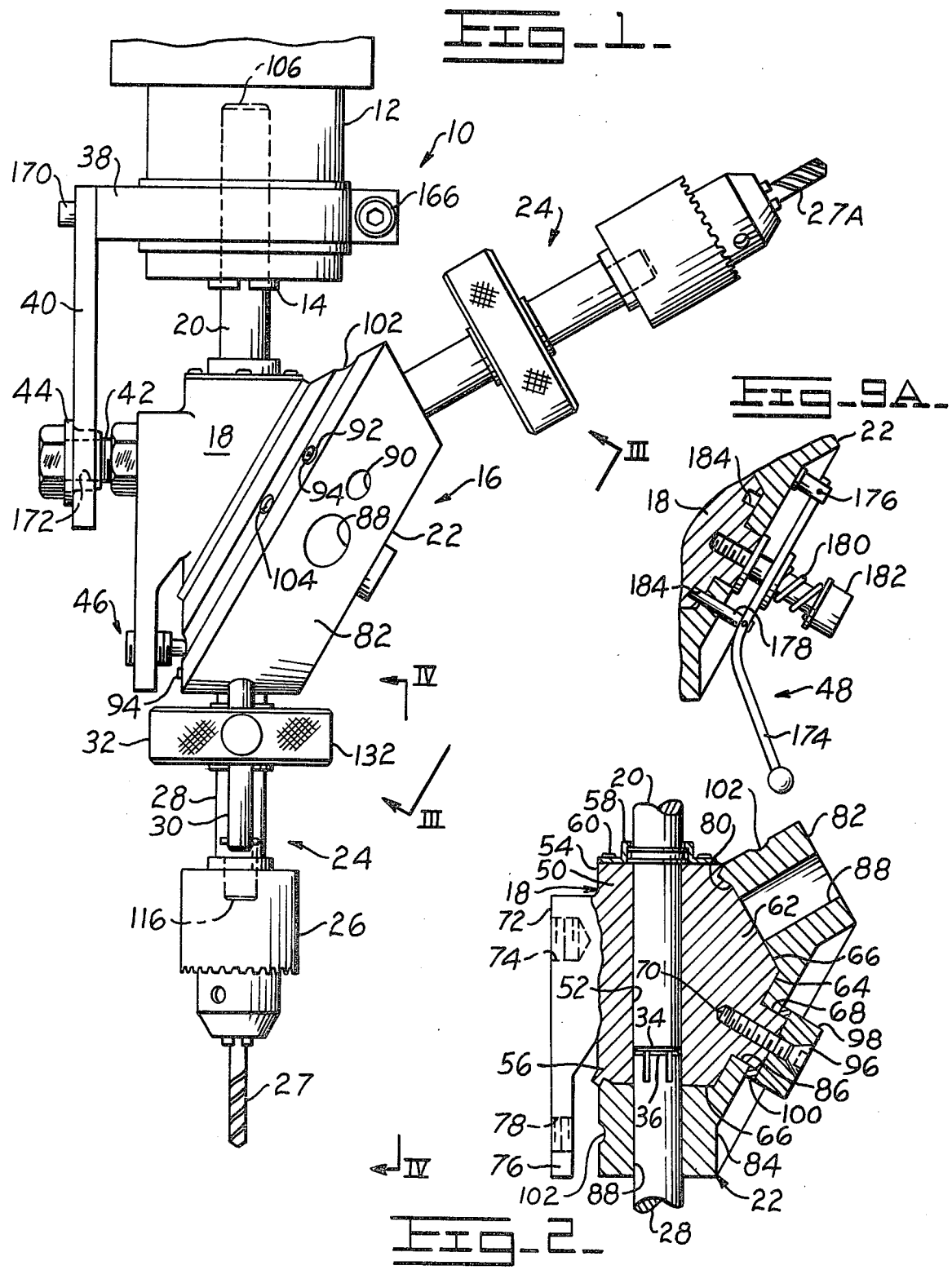

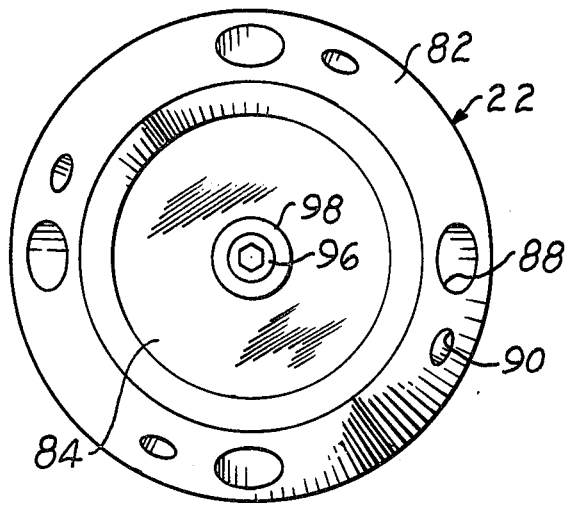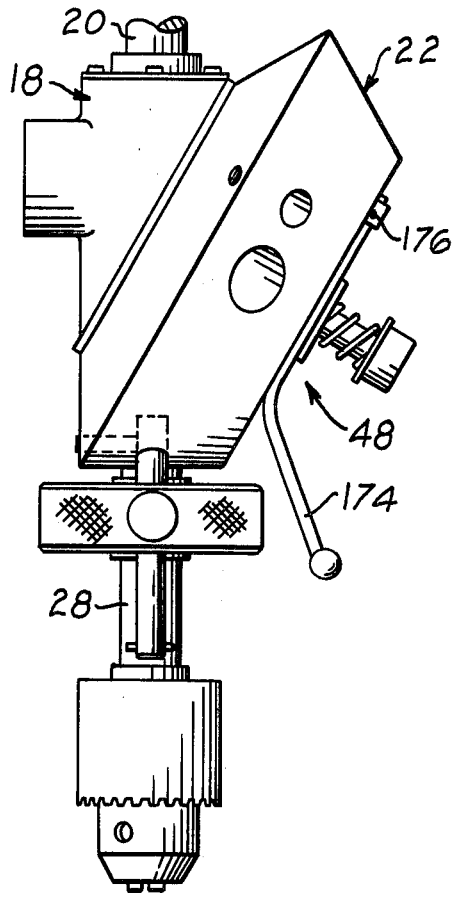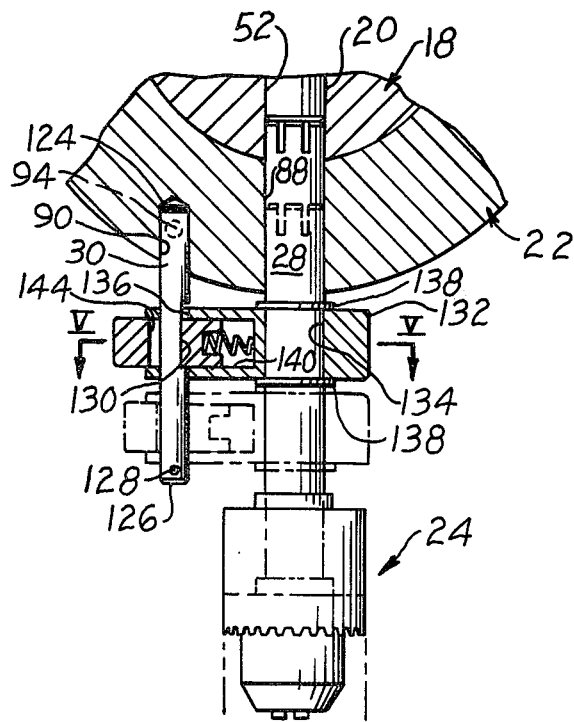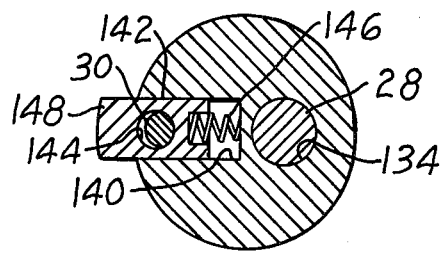

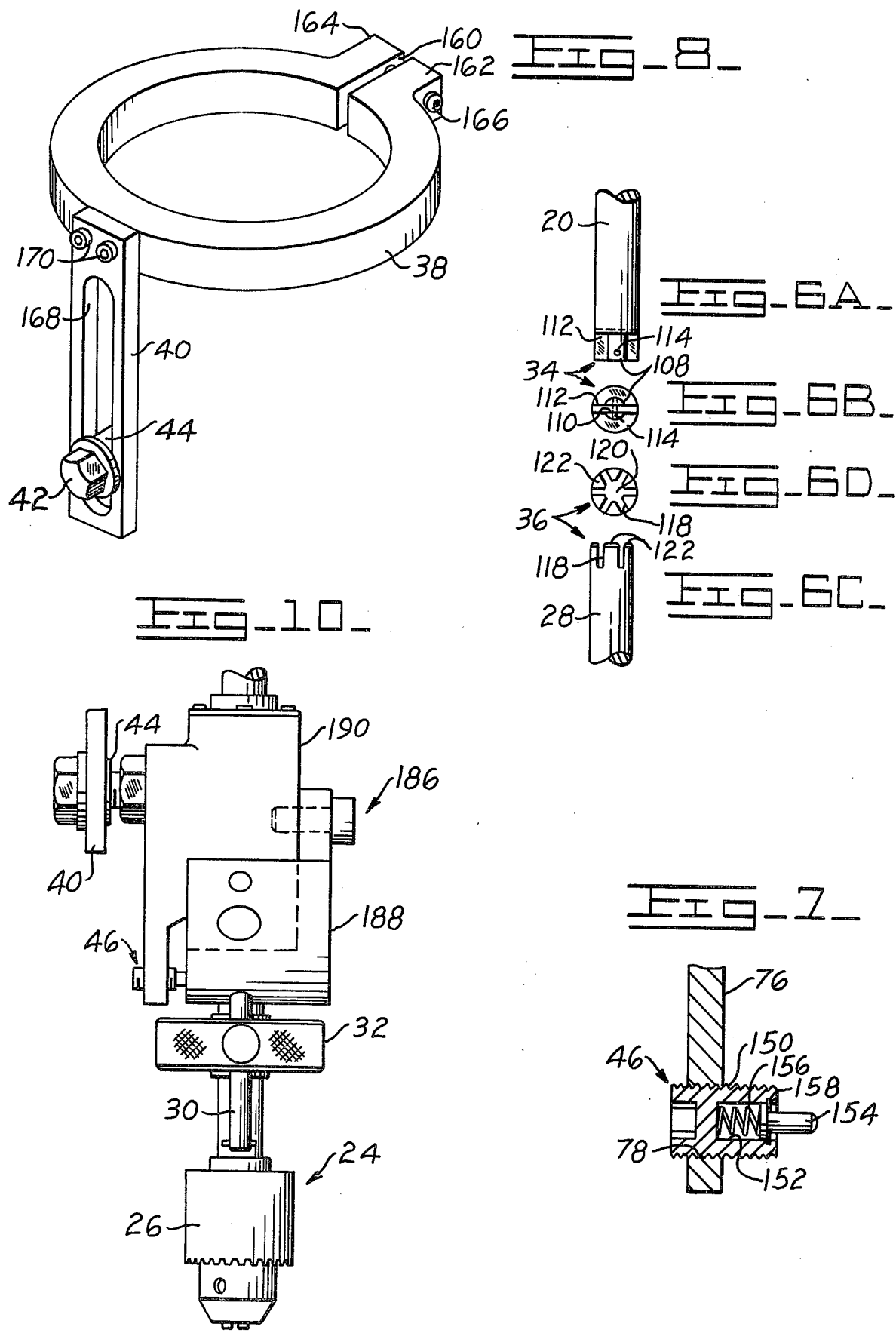

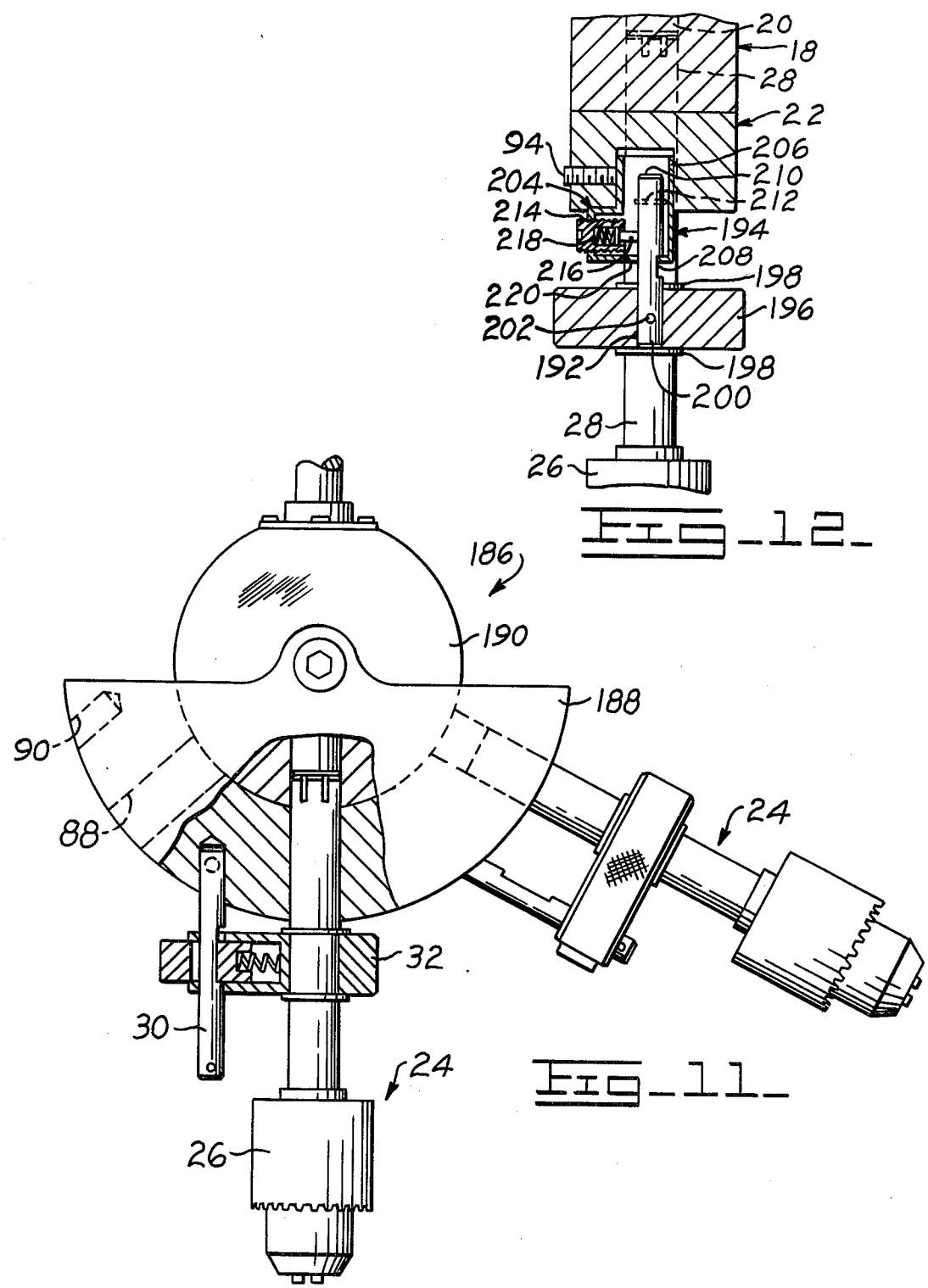

MULTIPLE TOOL DRIVING TURRET ATTACHMENT

CROSS-REFERENCE TO RELATED APPLICATIONS

This is a continuation-in-part of copending U.S. patent application Ser. No. 787,913, filed on Apr. 15, 1977 and now abandoned by Otto E. Dietrich and titled "Multiple Tool Driving Turret Attachments."

BACKGROUND OF THE INVENTION

1. Field of the Invention

This invention relates generally to cutting by use of rotating, axially moving tools and more particularly to a machine including a turret of tools.

2. Description of the Prior Art

Generally, powered machine tools have provided multiple tool driving attachments wherein a turret includes a plurality of chucks positionable so as to be driven by a single powered driver. This is convenient since a variety of attachments are mounted in each chuck and readily available for positioning to be powered by the driver. This eliminates changing various attachments into and out of a single chuck. However, the powered driver must be turned off so that the turret can be selectively positioned each time a different attachment is to be used in a desired machining operation. Once the turret is positioned and the attachment is engaged, the powered driver may be turned on and the next machining operation can begin. Thus, valuable time is wasted during machining operations due to the burden placed on the operator for repeatedly turning the machine power off and on.

In view of the above, it would be advantageous to provide a multiple tool driving attachment which could be selectively positioned and repositioned without the need to turn off the powered driver each time a different machining operation is desired.

SUMMARY OF THE INVENTION

The present invention is directed to overcoming one or more of the problems as set forth above.

According to the present invention this is accomplished by providing a tool driving attachment including a first rotatable tool driving member and a second tool driving member movable into alignment with the first member. Once the members are aligned, the second member may be guided and resiliently locked into and out of rotating engagement with the first tool member when the first member is rotating.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a side elevation illustrating the preferred multiple tool driving turret attachment of this invention;

FIG. 2 is a partial cross-sectional side elevation illustrating a portion of the attachment of FIG. 1;

FIG. 3 is a frontal view of the turret taken along lines III—III of FIG. 1;

FIG. 4 is a frontal view of the attachment in partial cross-section taken along lines IV—IV of FIG. 1;

FIG. 5 is a cross-sectional view taken along the lines V—V of FIG. 4;

FIG. 6A is an elevational view illustrating a portion of the first tool driving member of this invention;

FIG. 6B is an end view of the first tool driving member of FIG. 6A;

FIG. 6C is an elevational view illustrating a portion of the second tool driving member of this invention;

FIG. 6D is an end view of the second tool driving member of FIG. 6C;

FIG. 7 is a partial cross-sectional side elevation illustrating a resiliently urged member for aligning the first and second tool driving members of this invention;

FIG. 8 is an isometric view illustrating a clamp and slide portion of the attachment of FIG. 1;

FIG. 9 is a partial side elevation illustrating an alternative embodiment of the attachment of this invention;

FIG. 9A is a partial cross-sectional side elevation illustrating a portion of the alternative embodiment of FIG. 9;

FIG. 10 is a partial side elevation illustrating another alternative embodiment of the attachment of this invention;

FIG. 11 is a frontal view illustrating the attachment of FIG. 10; and

FIG. 12 is a partial cross-sectional side elevation illustrating a further alternative embodiment of the attachment of this invention.

DETAILED DESCRIPTION

Referring now to the drawings, FIG. 1 illustrates the environment of this invention. For example, a well known tool driving machine, such as a drill press, vertical mill or the like, is generally designated 10. Such tool driving machines generally include a column 12 having a rotatable driving member such as spindle 14 powered by a power source such as an electric motor (not shown).

A common attachment to tool driving machine 10 is a multiple tool driving turret attachment generally designated 16 and including a hub 18. A first tool driving means or shaft 20 is mounted for rotation in hub 18. Shaft 20 may be secured to and powered by spindle 14. A turret 22 is mounted for 360 degree rotation on hub 18 and includes a plurality of second tool driving means generally designated 24. Such second tool driving means 24 includes well known chucks 26 and their associated shafts 28. By virtue of the turret 22 being rotatable on hub 18, second tool driving means 24 may be moved relative to hub 18 so that shaft 28 is aligned with shaft 20. Upon engagement of shafts 28 and 20, the power supplied by tool driving machine 10 is transmitted through spindle 14 and shaft 20 to shaft 28 and ultimately to chuck 26. Thus, a plurality of chucks 26 may be equipped with various tool attachments such as different sized drill bits 27,27a, taps and the like, providing the operator of machine 10 with the ability to make relatively quick changes for tooling operations by selective positioning of turret 22 on hub 18 without the necessity of turning off the power to machine 10 while making such tooling changes.

Advantageously, the present invention includes, as an improvement to the above-described multiple tool driving turret attachment 16, an end 34 of shaft 20, keyed for mating engagement with an aligned keyed end 36 of shaft 28, and means operable, in response to the alignment of shafts 20 and 28, for guiding and locking shaft 28 into and out of rotating engagement with shaft 20 when shaft 20 is rotating. Such operable means generally includes a guide shaft 30. A resilient locking device 32 is included for locking shafts 20,28 into engagement. Also, the present invention includes an advantageous collar 38 and a slide arm 40, FIGS. 1 and 8. Collar 38 clamps onto column 12 and slide 40 is connected to and extends from collar 38. Hub 18 connects to slide 40 by means of a bolt 42 extending through a resilient grommet 44. Further, the present invention includes resiliently urged means, 46 in FIG. 1 and 48 in FIG. 9, operably connected for aligning first and second shafts 20,28 respectively.

Hub:

More specifically now, a preferred hub 18, FIG. 2, is of cast iron but can be made of other suitable material. Hub 18 includes a first portion 50 including an annular through-bore 52 for accommodating shaft 20 for rotation therein. Bore 52 extends through portion 50 from a first end 54 to a second end 56. A suitable bearing collar 58 is attached to first end 54 of bore 52 by screws 60. A second portion 62 is generally frustoconical and includes surfaces 64,66 for receiving turret 22. A portion 68 protrudes from surface 64 through turret 22 and includes a threaded aperture 70 therein. A flange 72, formed with hub 18 includes a threaded aperture 74 formed therein for receiving bolt 42. Flange 72 also includes flange arm 76 including a threaded aperture 78 formed therein for receiving resiliently urged aligning means 46 therein.

Turret:

Turret 22, FIGS. 1, 2 and 3, is generally annular and preferably of cast aluminum. The turret includes generally concave surface 80 usually lubricated for mating, rotating engagement with surfaces 64,66 of hub 18. The turret also includes generally convex surface 82 having an annular relief 84 therein. An opening 86, best shown in FIG. 2, is formed through turret 22 for receiving protruding portion 68. A plurality of annular bores 88 are formed through turret 22 for slidably receiving shafts 28 therethrough, see FIGS. 1, 2, 3. Bores 88 are preferably annularly spaced about turret 22. Bores 88 are of the same diameter as bores 52. Depending on the size of turret 22, the number of bores 88 may vary. A second plurality of blind bores 90, FIGS. 1,3, are provided in surface 82 for receiving guide shafts 30 therein. A third plurality of blind bores 92 are formed in turret 22 and extend to intersect bores 90. Bores 92 are threaded to receive set screws 94 for engagement with, and securing of, guide shafts 30 in bores 90. Turret 22 is preferably rotatably secured to hub 18 by a well known screw 96, thrust washer 98 and washer 100. Screw 96 is received into threaded aperture 70 of hub 18. An annular groove 102 may be provided in turret 22 for guiding resiliently urged alignment means 46 along the turret. However, turret 22 rotates in a fixed path relative to alignment means 46 so that formation of a groove 102 is not essential. Whether or not groove 102 is provided, a plurality of detents 104 are necessary to receive resiliently urged alignment means 46. Detents 104 are located on turret 22 to engage alignment means 46 at selective positions providing for alignment of bores 52,88 and their respective shafts 20,28.

First Tool Driver:

First tool driving means or shaft 20, FIGS. 1 and 2, is mounted for rotation in bore 52 of hub 18. Shaft 20 is preferably of a suitable steel and includes a first end 106 secured in collar 12 by spindle 14 as is well known. Shaft 20 extends from spindle 14, through collar 58 and terminates within bore 52 at a keyed second end 34. Shaft 20 must not extend beyond surface 66 of hub 18, otherwise the shaft would interfere with relative movement between turret 22 and hub 18. Shaft 20 is secured by collar 58 to permit rotation within hub 18 but to limit axial movement within the hub. Keyed end 34 of shaft 20, FIGS. 6A-B, includes a protruding annular portion 108 having a slot 110 formed therein. A steel tab 112, retained in slot 110 by a pin 114, forms a single keyed member on shaft 20.

Second Tool Driver:

Second tool driving means 24, FIG. 1, are each movably mounted on hub 18 for alignment with shaft 20 by virtue of their attachment to turret 22. Each of the second tool driving means includes a well known, commercially available chuck 26 for accommodating any of several well known bits used with such chucks such as drill bits 27,27a, mills, taps, or the like, and a shaft 28 secured to chuck 26 at a first end 116 and terminating at a keyed second end 36, see FIGS. 1 and 6D-C. Shaft 28 is the same diameter as shaft 20 and is secured to chuck 26 for rotation therewith. Keyed end 36 of shaft 28 includes a plurality of keyways or slots 118 sufficient for receiving tab 112. Slots 118 intersect through annular recess 120 sufficient for receiving protruding annular portion 108. Surfaces 122, between each slot 118, are rounded to guide tab 112 into any one of the slots 118.

Guide Shaft and Resilient Locking Device:

Means are operable for moving shaft 28 into and out of rotating engagement with shaft 20. This is accomplished by the use of guide shaft 30 and resilient locking device 32. Shaft 30 can be of any suitable material but is preferably of steel. Shaft 30 is of a smaller diameter than shaft 20 and 28. First end 124 of shaft 30 may be inserted into bore 90 of turret 22 and secured therein by set screw 94, see FIGS. 1 and 4. Shaft 30 thus protrudes from turret 22 and terminates at second end 126 including pin 128 inserted therethrough. A notch 130 is formed in shaft 30 between ends 124,126 for receiving a portion of resilient locking device 32. Resilient locking device 32 comprises an annular aluminum housing 132 including an axial bore 134 for receiving shaft 28 for rotation therein and an axial bore 136 for receiving shaft 30 therethrough, see FIGS. 4 and 5. Thus, locking device 32 interconnects shafts 28 and 30. Shaft 28 is locked into fixed relationship with housing 132 by snap rings 138 to permit shaft 28 and housing 132 to move toward and away from shaft 20. Shaft 30 is slidably engaged in bore 136. A radially directed blind bore 140 is formed in housing 132 and intersects bore 136. A tab 142 is resiliently mounted in blind bore 140 by spring 146. An axial bore 144 is provided through tab 142. Bore 144 is the same diameter as bore 136 for slidably receiving shaft 30. Thus, due to the presence of notch 130, tab 142 is urged into locking engagement with shaft 30 as shaft 28 and housing 132 are slidably moved in bore 88 toward shaft 20. Similarly, tab 142 may be hand depressed at button end 148 so as to be urged out of locking engagement with notch 130.

Resiliently Urged Alignment:

Resiliently urged aligning means 46, FIGS. 1 and 7, is preferably provided by threaded member 150 mounted in threaded aperture 78 of flange arm 76. Blind bore 152, formed in member 150, includes a plunger 154, preferably of a suitable synthetic material, resiliently urged by spring 156, or the like, against a stop 158 for limited movement relative to member 150. Threaded member 150 is commercially available. Plunger 154 is urged into groove 102 by spring 156 or, in the absence of a groove, against turret 22 until the plunger is urged into one of the detents 104 indicating alignment of bores 52,88 and their respective shafts 20,28.

Clamp and Slide:

Clamp 38, FIGS. 1 and 8, is preferably an annular member of cast aluminum having an opening 160 therein. Flanges 162,164, adjacent the opening, are interconnected by a threaded member 166 which, when manipulated, operates to increase or decrease the clamp diameter. In this manner, clamp 38 can be secured to or removed from collar 12. Slide 40 is preferably an elongated aluminum casting including a slot 168 formed therein for accommodating bolt 42 and grommet 44. Slide 40 is secured to clamp 38 by threaded members 170, or the like. Grommet 44 is preferably formed of a suitable resilient material and includes a bore 172 therethrough for receiving bolt 42.

Alternative Resiliently Urged Alignment:

Alignment of first and second shafts 20,28 can alternatively be achieved as shown in FIGS. 9 and 9A. Resiliently urged alignment means 48 includes arm 174 pivotally connected to turret 22 at pin 176. Arm 174 includes a protruding member 178. Member 182 is threaded into hub 18 for rotatably mounting turret 22 on hub 18. A spring 180, or the like, mounted on member 182, urges arm 174 and protruding member 178 into any one of a plurality of detents 184 provided in hub 18. Detents 184, similar to detents 104, of FIG. 1, are annularly positioned for providing alignment of any of the bores 88 with bore 52 and their respective shafts 28,20 when member 178 is urged thereinto.

Alternative Tool Driving Attachment:

Alternative tool driving attachment 186, see FIGS. 10 and 11, provides a turret 188 mounted on a hub 190 for less than 360 degree rotation therewith and for accommodating a fewer number of second tool driving means 24, for example three, therein. Such an attachment 186 is usable with resilient alignment means 46, clamp 38 and slide 40, grommet 44, guide shaft 30 and resilient locking means 32 as described above for use with attachment 16.

Alternative Guide Shaft and Resilient Locking Device:

Alternative guide shaft 192 and resilient locking device 194 are illustrated in FIG. 12. Shaft 192 is similar to its counterpart guide shaft 30. However, guide shaft 192 is connected for fixed movement with second shaft 28, toward and away from first shaft 20 in hub 18. This is accomplished by providing an interconnecting member 196 for rotatably receiving shaft 28 therein. Also, due to snap rings 198, shaft 28 is fixed for concerted movement with member 196 toward and away from shaft 20. One end 200 of shaft 192 is secured in member 196 for fixed movement therewith by roll pin 202 or the like. Also included in shaft 192 is a notch 208 or the like. Another end 210 of shaft 192 includes a roll pin 212, or the like, transversely secured therein for protruding from shaft 192.

Resilient locking device 194 comprises a cylindrical housing 204 including a tubular reduced diameter extension 206. Housing 204 is secured in turret 22 by set screw 94, or the like. A resiliently urged means 214, similar to resiliently urged means 46, in FIG. 7, is threaded into housing 204 and includes tab 216 resiliently urged by spring 218 into engagement with shaft 192. Extension 206 has a substantially larger inside diameter than the outside diameter of shaft 192. Shaft 192 enters housing 204 through an opening 220. Also, shaft 192 extends into extension 206.

OPERATION

Attachment 16 is connected to machine 10 by securing clamp 38 to column 12. Hub 18 is limited from rotation by securing bolt 42 to slide 40. Also vibration damping between attachment 16 and machine 10 is enhanced by the use of grommet 44 between hub 18 and slide 40.

Second tool driving means 24 is secured to turret 22 due to shaft 30 being retained in bore 90 by set screw 94. For rotation of turret 22 on hub 18, shaft 28, resilient locking member 32 and chuck 26 move as a unit to retract shaft 28 from bore 52 and out of engagement with shaft 20. This is accomplished by hand depressing button end 148 to release tab 142 from notch 130. Thus with bores 144,136 aligned, locking member 32, shaft 28 and chuck 26 are movable on guide shaft 30 to a position where locking member 32 engages pin 128, see FIG. 4. In this mode, turret 22 may be freely rotated on hub 18. This can be accomplished when shaft 20 is rotating due to power supplied by machine 10 through spindle 14.

Assuming that shaft 20 is rotating, and a specific tool operation is to be performed, the chuck 26 which holds the desired tool may be rotated with turret 22 to the lowermost position directly below and aligned with column 12. As turret 22 is rotated, plunger 154 tracks on turret 22 and automatically snaps into and out of detents 104. When plunger 154 snaps into a detent 104 and the desired chuck is directly below column 12, this indicates that bore 52 and one of the associated bores 88 are aligned. Also, shaft 20 and an associated shaft 28 are aligned. Upward force applied to second tool driving means 24 will urge shaft 28 upwardly, guided by shaft 30 and lock 32. With the upward force maintained, tab 112 will be felt to engage rounded surfaces 122 which ultimately will guide tab 112 into one of the slots 118. Simultaneously, shaft 28 will begin to rotate and tab 142 will be in position to snap into engagement with notch 130 for maintaining shafts 20,28 in locked rotating engagement. The above procedure can be repeated for selectively disengaging and engaging any of the second tool driving means with the first tool driving means.

Use of alternative tool attachment 186 for rotating turret 188 on hub 190 is similar except that turret 188 is not provided for 360 degree rotation on hub 190 and turret 188 is provided to accommodate fewer chucks 26 than turret 22.

Use of alternative resilient alignment means 48 is similar except that arm 174 must be manually controlled for disengaging protruding member 178 from detents 184. Once member 178 is so disengaged, arm 174 must be continually controlled to prevent member 178 from snapping into an undesired one of the detents 184. When the desired alignment of turret 22 is achieved on hub 18, manual control of arm 174 is no longer required.

Alternative shaft 192 and resilient locking device 194 may be used for locking second shaft 28 in rotating engagement with first shaft 20 and for releasing second shaft 28 from engagement with shaft 20. When shaft 192, member 196 and shaft 28 are concertedly moved toward shaft 20, rotating engagement of shafts 20,28 is accomplished with the simultaneous alignment of opening 220 and notch 208. Thus, tab 216 resiliently urges shaft 192 to rotate with member 196 about shaft 28 and as a result, shaft 192 is locked into engagement with locking device 194. When it is desired to move shafts 20,28 out of rotating engagement, shaft 192 and member 196 are manually rotated about shaft 28 to displace tab 216 against spring 218 until notch 208 clears opening 220. At this point, shaft 192 can be withdrawn from housing 204 limited by pin 212. Such withdrawing of shaft 192 is accompanied by concerted movement of member 196 and shaft 28 so that shafts 20,28 are disengaged from rotating engagement.

The foregoing has described a tool driving attachment for use with a powered tool driving machine. First and second tool driving members may be selectively engaged and disengaged while they are rotating.

The embodiments of the invention in which an exclusive property or privilege is claimed are defined as follows:

1. A tool driving attachment of the type including a turret rotatably mounted on a hub, a first keyed shaft rotatably mounted in the hub and a plurality of second keyed shafts mounted for rotation in the turret and for alignment with the first shaft, the improvement comprising:
   means for guiding each second shaft into and out of engagement with the first shaft, said guiding means being substantially parallel with said second shaft and being attached to one of said turret or said second shaft; and
   means for locking said second shaft in rotating engagement with the first shaft and for releasing said second shaft from rotating engagement therewith, said locking means being attached to the other of said turret or said second shaft and being connected for locking and releasing engagement with said guiding means.

2. The tool driving attachment of claim 1 wherein the guiding means is fixedly connected to the turret.

3. The tool driving attachment of claim 1 wherein the locking means is connected to the second shaft for fixed movement therewith toward and away from first shaft.

4. The tool driving attachment of claim 1 wherein the locking means is connected for sliding on the guiding means into locking engagement therewith.

5. The tool driving attachment of claim 2 wherein the locking means is mounted in a housing.

6. The tool driving attachment of claim 5 wherein the second shaft is connected for rotation in the housing and connected for fixed movement with the housing toward and away from the first shaft.

7. The tool driving attachment of claim 6 wherein the housing is slidably connected to the guiding means.

8. The tool driving attachment of claim 1 including a clamp and slide operably connected to the hub.

9. The tool driving attachment of claim 8 including a resilient member connected between the hub and slide.

10. The tool driving attachment of claim 1 wherein the guiding means is slidably connected to the turret.

11. The tool driving attachment of claim 1 wherein the locking means is connected to the turret for slidably receiving the guiding means.

12. The tool driving attachment of claim 1 wherein the guiding means is connected for fixed movement with the second shaft toward and away from the first shaft.

13. The tool driving attachment of claim 1 including a housing fixedly secured to the turret.

14. The tool driving attachment of claim 13 wherein the locking means is mounted in the housing.

15. The tool driving attachment of claim 14 wherein the guiding means is connected for fixed movement with the second shaft toward and away from the first shaft.

16. The tool driving attachment of claim 15 wherein the guiding means is connected for sliding movement in the housing for locking engagement with the locking means.

17. A tool driving apparatus comprising:
   a hub;
   a turret rotatably mounted on the hub;
   a first keyed shaft rotatably mounted in the hub;
   a plurality of second keyed shafts mounted for rotation in the turret and for alignment with the first shaft;
   means for guiding each second shaft into and out of engagement with the first shaft, said guiding means being substantially parallel with said second shaft and being attached to one of said turret or said second shaft; and
   means for locking said second shaft in rotating engagement with the first shaft and for releasing said second shaft from rotating engagement therewith, said locking means being attached to the other of said turret or said second shaft and being connected for locking and releasing engagement with said guiding means.

* * * * *